(12) United States Patent
Osborn et al.

(10) Patent No.: US 7,971,838 B2
(45) Date of Patent: Jul. 5, 2011

(54) FLANGE-ENGAGING CLAMP

(75) Inventors: Eric C. Osborn, Medina, OH (US);
Nicholas J. Ambrogio, Highland Heights, OH (US); Eric J. Wilson, Solon, OH (US); Paul Hart, Warren, OH (US)

(73) Assignee: ERICO International Corporation, Solon, OH (US)

( * ) Notice: Subject to any disclaimer, the term of this patent is extended or adjusted under 35 U.S.C. 154(b) by 193 days.

(21) Appl. No.: 12/356,627

(22) Filed: Jan. 21, 2009

(65) Prior Publication Data

US 2009/0184222 A1 Jul. 23, 2009

Related U.S. Application Data

(60) Provisional application No. 61/022,406, filed on Jan. 21, 2008.

(51) Int. Cl.
*A47B 96/06* (2006.01)
(52) U.S. Cl. .................. 248/228.1; 248/231.71
(58) Field of Classification Search ............. 248/231.71, 248/65, 72, 228.1, 228.6, 48.1, 48.2; 52/167.3, 52/741.3
See application file for complete search history.

(56) References Cited

U.S. PATENT DOCUMENTS

| 98,656 | A | 1/1870 | Adt |
| 714,461 | A | 11/1902 | Dieter |
| 714,761 | A | 12/1902 | Tilley |
| 1,282,489 | A | 10/1918 | Strodel |
| 1,559,084 | A | 10/1925 | Gaillard |
| 1,790,610 | A * | 1/1931 | Vindal ............................. 285/64 |
| 2,045,307 | A | 6/1936 | O'Connell |
| 2,375,513 | A | 5/1945 | Bach |
| 2,665,951 | A | 1/1954 | Bobst |
| 2,699,190 | A | 1/1955 | Packer |
| 2,715,013 | A | 8/1955 | Slick |
| 2,722,858 | A | 11/1955 | Oyen |
| 2,951,672 | A | 9/1960 | Bott |
| 2,958,559 | A * | 11/1960 | Jensen ........................ 296/97.6 |
| 3,100,048 | A | 8/1963 | Halverson |

(Continued)

FOREIGN PATENT DOCUMENTS

CA 2279777 A1 10/2000

(Continued)

OTHER PUBLICATIONS

International Search Report and Written Opinion from corresponding International Application No. PCT/US09/31391.

*Primary Examiner* — Anita M King
(74) *Attorney, Agent, or Firm* — Renner, Otto, Boisselle & Sklar, LLP

(57) ABSTRACT

A clamp for engaging a structure flange includes a clamp body having a slot between a pair of body sections, a spring clip on the clamp body that extends into the slot, and a pair of screws threadedly engaged with the clamp body. The spring clip holds a structure flange in place when the clamp is placed on a structure flange, with the flange in the slot. This allows the installer to tighten the screws to engage the flange, without having to simultaneously hold the clamp in place. The screws may bite into the flange, providing a more secure coupling between the clamp and the structure flange. The clamp may be used to mount a variety of objects, such as sway braces for seismic bracing.

25 Claims, 3 Drawing Sheets

U.S. PATENT DOCUMENTS

| | | | |
|---|---|---|---|
| 3,120,046 A | 2/1964 | Olsen | |
| 3,258,821 A | 7/1966 | Curran | |
| 3,269,766 A | 8/1966 | Gardner | |
| 3,301,513 A * | 1/1967 | Masao | 248/72 |
| 3,321,161 A * | 5/1967 | Hirt | 248/72 |
| RE26,247 E * | 8/1967 | Tinnerman | 248/72 |
| 3,342,909 A | 9/1967 | Fenton | |
| 3,572,623 A | 3/1971 | Lapp | |
| 3,575,405 A | 4/1971 | Harding | |
| D226,856 S | 5/1973 | Leto et al. | |
| 3,937,121 A | 2/1976 | Schubert | |
| 3,947,011 A | 3/1976 | Tsuyama | |
| 3,997,152 A | 12/1976 | Sass et al. | |
| 4,065,218 A | 12/1977 | Biggane | |
| 4,183,571 A | 1/1980 | Renfroe | |
| 4,228,983 A | 10/1980 | Bowman, Jr. | |
| D259,464 S | 6/1981 | Paley | |
| D262,237 S | 12/1981 | Stauber | |
| 4,342,477 A | 8/1982 | McClure | |
| 4,429,440 A | 2/1984 | Laughlin et al. | |
| 4,491,358 A | 1/1985 | Choung | |
| 4,524,942 A | 6/1985 | Kueny | |
| 4,570,885 A | 2/1986 | Heath | |
| 4,763,871 A | 8/1988 | Probst | |
| 4,844,397 A | 7/1989 | Skakoon et al. | |
| 4,850,630 A | 7/1989 | Davies | |
| 4,998,691 A | 3/1991 | Brown | |
| 5,005,890 A | 4/1991 | Schwenger | |
| 5,188,317 A | 2/1993 | Roth | |
| 5,326,059 A | 7/1994 | Pryor et al. | |
| 5,349,979 A | 9/1994 | Zeien et al. | |
| 5,687,938 A | 11/1997 | Bailey | |
| 5,931,259 A | 8/1999 | Hoey | |
| 6,012,691 A | 1/2000 | van Leeuwen et al. | |
| 6,098,942 A | 8/2000 | Heath | |
| 6,119,992 A | 9/2000 | Stuart | |
| 6,227,757 B1 | 5/2001 | Delouvee et al. | |
| 6,273,372 B1 * | 8/2001 | Heath | 248/62 |
| 6,334,285 B1 | 1/2002 | Kirschner | |
| 6,517,030 B2 | 2/2003 | Heath | |
| 6,629,678 B1 | 10/2003 | Kirschner | |
| 6,702,132 B1 | 3/2004 | Moore et al. | |
| 6,708,930 B2 | 3/2004 | Heath | |
| 6,789,649 B2 | 9/2004 | Herrmann | |
| 6,953,174 B2 | 10/2005 | Heath | |
| 7,097,141 B2 | 8/2006 | Heath | |
| 7,140,579 B2 | 11/2006 | Kirschner | |
| 7,191,987 B2 | 3/2007 | Heath | |
| 7,281,695 B2 * | 10/2007 | Jordan | 248/274.1 |
| 7,431,252 B2 | 10/2008 | Birli et al. | |
| 7,441,730 B2 * | 10/2008 | Heath | 248/62 |
| 2005/0230582 A1 | 10/2005 | Birli et al. | |
| 2006/0024127 A1 | 2/2006 | Heath | |
| 2007/0170317 A1 | 7/2007 | Heath | |
| 2008/0277535 A1 | 11/2008 | Kirschner | |
| 2009/0183443 A1 * | 7/2009 | Osborn et al. | 52/167.3 |
| 2009/0183462 A1 * | 7/2009 | Osborn et al. | 52/745.21 |
| 2009/0183463 A1 | 7/2009 | Osborn et al. | |

FOREIGN PATENT DOCUMENTS

| | | |
|---|---|---|
| JP | 57131907 | 8/1982 |
| JP | 57176504 | 11/1982 |
| JP | 02012506 U | 1/1990 |
| JP | 738863 U | 7/1995 |
| JP | 8128196 A | 5/1996 |
| JP | 08144508 A | 6/1996 |
| JP | 9210021 A | 8/1997 |
| JP | 11035128 A | 2/1999 |
| JP | 11256813 A | 9/1999 |
| KR | 2019980059451 U | 10/1998 |
| KR | 200396479 Y1 | 9/2005 |
| WO | 2009094302 A2 | 7/2009 |
| WO | 2009094303 A2 | 7/2009 |
| WO | 2009094313 A2 | 7/2009 |
| WO | 2009094320 A2 | 7/2009 |

* cited by examiner

FLANGE-ENGAGING CLAMP

This application claims priority under 35 USC 119 from U.S. Provisional Application No. 61/022,406, filed Jan. 21, 2008, which is incorporated herein by reference in its entirety.

BACKGROUND OF THE INVENTION

1. Field of the Invention

The invention is in the field of clamps, including clamps for seismic bracing and sway braces.

2. Description of the Related Art

Seismic sway bracing is often required for plumbing systems, fire sprinklers, electrical systems, heating conduits, ventilation conduits, air conditioning conduits, and other structural and non-structural components of a building as well as some equipment installed in buildings. One way of sway bracing is to couple a system to be braced to a pipe or other rigid structural member that is in turn coupled to building structure, such as a wall or a building structural member, for example a bar joist, I-beam, or other flanged member.

SUMMARY OF THE INVENTION

A sway-brace clamping device provides a secure attachment point on open web steel joist or other structure, using a spring innovation. The spring grabs onto the flange of the open web steel joist (or other structure), which frees both of the installer's hands to tighten snap-off screws that indicate proper installation.

The broad field application of this design is to provide a secure attachment point on the upper flange of a steel bar joist. The clamp consists of a cast ductile iron bracket with a slot that passes through the length of the bracket. This slot accepts the lower leg of a steel bar joist flange. Two tapped holes in the bracket accept engineered hardened cone tip screws. These screws are used to bite into the face of the bar joist flange during installation. To insure proper biting force, the heads of the screws are configured to snap off at a predetermined torque. In addition, a single tapped through hole in the bracket is used as the attachment point. A stamped steel spring is mounted onto the cast bracket using tabs, formed in the stamping process, to hold it in place. During the installation of the adapter assembly, the spring is compressed backwards by the flange of the bar joist. At the same time, the spring forces the back wall of the slot in the cast bracket against the back face of the bar joist flange. Tabs formed on the spring then grab onto the flange of the bar joist and hold the adapter assembly in place. This allows the installer to remove his hands from the adapter and proceed to tightening the engineered screws.

According to an aspect of the invention, a clamp includes a stamped spring combined with a cast bracket, used to grip onto a steel bar joist or other structural member.

According to another aspect of the invention, tabs (or steps) in the cast bracket slot of a clamp body (bracket) insure the proper depth of a flange positioned in the slot.

According to yet another aspect of the invention, a clamp for clamping flange structure includes snap-off-head screws used to verify a designated torque is reached.

According to still another aspect of the invention, a clamp includes a stamped spring the shape of which allows it to grip onto the bracket and the steel bar joist flange or other flange.

According to a further aspect of the invention, a clamp includes a tab on a spring that allows the installer to pull the spring backward for installation or removal.

According to a still further aspect of the invention, a clamp has a spring that has teeth or edges on its tabs that help the spring dig into the steel bar joist flange or other flange.

According to another aspect of the invention, an assembly is made up of three components, one for clamping around the bar joist flange (or other flange), a spring to grip on to the flange, and engineered cone point screws.

According to yet another aspect of the invention, a clamp includes: a clamp body having a slot between two body sections of the clamp body; a spring clip coupled to the clamp, wherein part of the spring is in the slot; and a pair of screws engaged with threaded holes in the clamp body, wherein the screws can be tightened such that tips of the screws enter the slot.

According to still another aspect of the invention, a clamp includes: a clamp body having a slot therein between two body sections of the clamp body; a spring mechanism coupled to the clamp body, for holding a structural flange in the slot, pressing the structural flange against one of the body sections; and a threaded mechanism threaded into the clamp body, for biting into the structural flange in the slot while the flange is pressed against one of the body sections by the spring mechanism.

According to a further aspect of the invention, a method of engaging a clamp to a structure flange includes: placing a clamp body of the clamp on the structure flange such that the structure flange is in a slot in the clamp body; coupling the clamp body to the structure flange using a spring clip of the clamp, wherein the spring clip is coupled to a first section of the clamp body, on one side of the slot, and presses the structure flange against a second section of the clamp body, on an opposite side of the slot; and while the clamp body is coupled to the structure flange using the spring clip, securing the clamp body to the structure flange using screws of the clamp that are threaded into threaded holes in the clamp body, and that have tips that bite into the structural flange.

Unless it is indicated otherwise, it is to be understood that the above aspects of the invention and the features of the embodiment(s) of the invention described below, may be combinable in a single device, in various combinations.

To the accomplishment of the foregoing and related ends, the invention comprises the features hereinafter fully described and particularly pointed out in the claims. The following description and the annexed drawings set forth in detail certain illustrative embodiments of the invention. These embodiments are indicative, however, of but a few of the various ways in which the principles of the invention may be employed. Other objects, advantages and novel features of the invention will become apparent from the following detailed description of the invention when considered in conjunction with the drawings.

BRIEF DESCRIPTION OF THE DRAWINGS

Annexed are drawings depicting one or more embodiments of the invention. The drawings are not necessarily to scale.

DETAILED DESCRIPTION

A clamp for engaging a structure flange includes a clamp body having a slot between a pair of body sections, a spring clip on the clamp body that extends into the slot, and a pair of screws threadedly engaged with the clamp body. The spring clip holds a structure flange in place when the clamp is placed on a structure flange, with the flange in the slot. This allows the installer to tighten the screws to engage the flange, without having to simultaneously hold the clamp in place. The screws may bite into the flange, providing a more secure coupling between the clamp and the structure flange. The clamp may be used to mount a variety of objects, such as sway braces for seismic bracing.

Following are relevant definitions:

1) STRUCTURE ATTACHMENT FITTING—A device used to attach a sway brace directly to the building structure;

2) SWAY BRACE—A rigid structural member, typically a piece of steel pipe, strut or angle, intended to attach the sprinkler system pipe (or other object to be braced) to a building structure using a sway brace fitting attached to the sway brace and sprinkler system pipe (or other object to be braced); and a structure attachment fitting attached to the sway brace and building structure;

3) SWAY BRACE ASSEMBLY—A structural system consisting of a sway brace connected to a sway brace fitting attached to the sprinkler system pipe (or other object to be braced) on one end and connected to a structure attachment fitting attached to the building on the other. These assemblies are intended to connect sprinkler system piping or other piping systems (or other object to be braced) to a building structure to provide resistance to relative horizontal movement between the building and the sprinkler system piping or other piping systems (or other object to be braced) during an earthquake or other shock waves impacting a building; and 4) SWAY BRACE FITTING—A device used to attach a sway brace to the sprinkler system piping (or other object to be braced).

Figure 1:
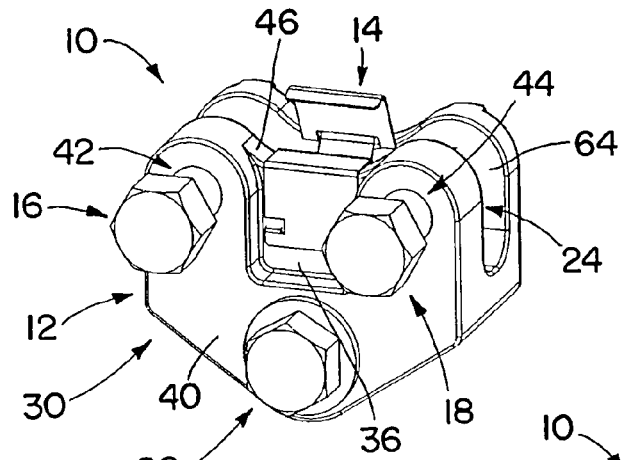
FIG. 1 is an oblique view of a clamp in accordance with an embodiment of the present invention.
Figure 2:
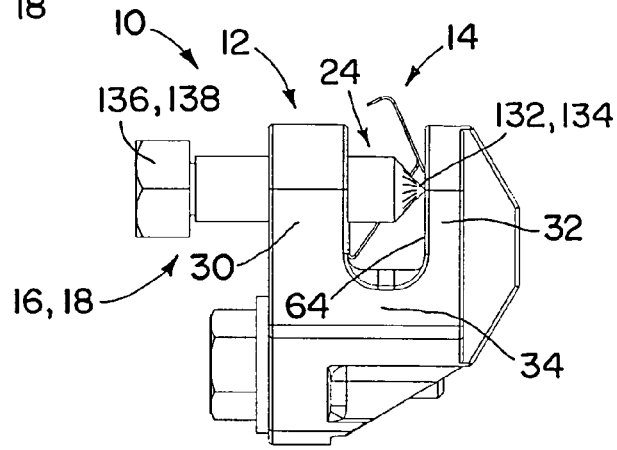
FIG. 2 is an end view of the clamp of FIG. 1.
Figure 3:
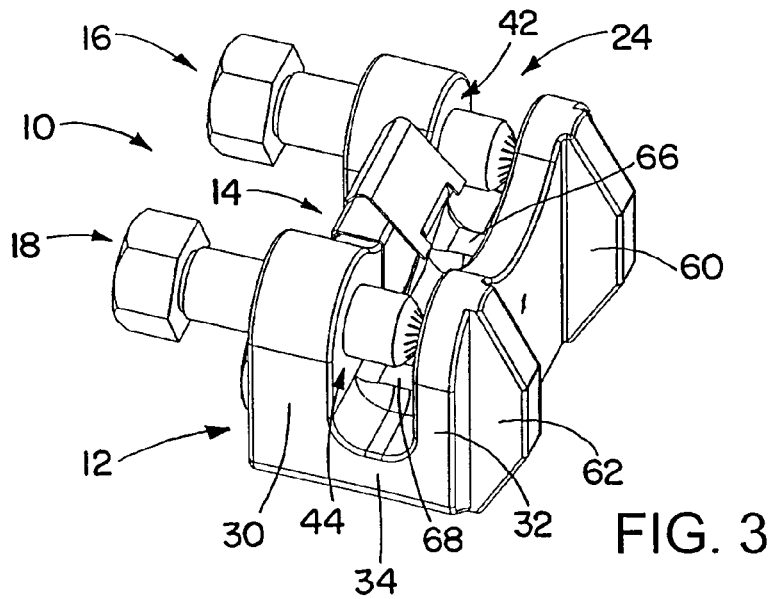
FIG. 3 is another oblique view of the clamp of FIG. 1.

Referring initially to FIGS. 1-3, a sway brace fitting clamp 10 is used to attach to a structure flange, such as a bar joist flange or I-beam flange. The clamp 10 may be used to attach a sway brace, such as a sway brace pipe or bar, to structure.

The clamp 10 includes a clamp body 12, a spring clip 14, a pair of screws 16 and 18, and a mounting bolt 20. In brief, the clamp body 12 has a slot 24 along its length for receiving the structure flange. The spring clip 14 is used for retaining the clamp body 12 coupled to the flange while an installer tightens the screws 16 and 18 to engage the flange. The mounting bolt 20 is used to couple a sway brace or other object to the clamp 10.

Figure 4:
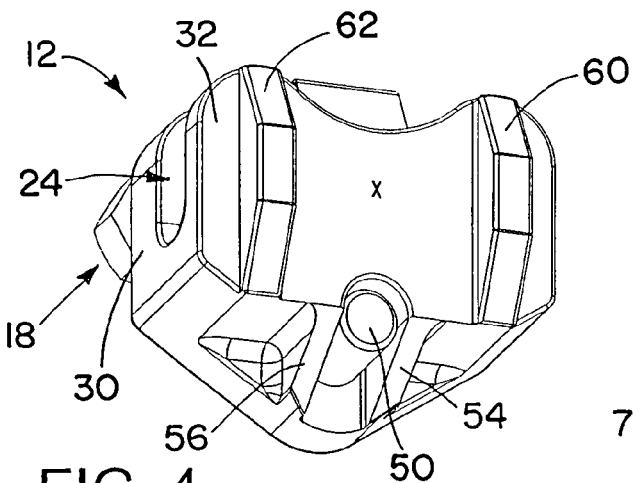
FIG. 4 is an oblique view of a clamp body of the clamp of FIG. 1, showing a back of the clamp body.

With reference now in addition to FIG. 4, the clamp body 12 may be made of a single unitary unbroken piece of material, such as cast iron or steel. The slot 24 separates a pair of body sections 30 and 32, which are joined together by a bridge 34 at the bottom of the slot 24. The body section 30 has a thin central flange portion 36 bordered on three sides by a C-shape thicker portion 40. The thicker portion 40 borders the central flange portion 36 on the central flange portion's sides and bottom.

The thicker portion 40 has three threaded (tapped) holes in it. Two screw-receiving threaded holes 42 and 44 are on either side of the flange portion 36, near a top surface 46 of the clamp body 12, for receiving the screws 16 and 18. The threaded holes 42 and 44 extend through the body section 30, and are in communication with the slot 24. A mounting hole 50 is located below the flange portion 36, midway between the sides of the clamp body 12. The mounting hole 50 is configured to receive the mounting bolt 20 that is used for coupling a sway brace or other item to the clamp body 12. The mounting hole 50 passes below the slot 24, and the back of the hole 50 is accessible from the opposite side of the clamp body 12. Struts 54 and 56 are on the back side of the body section 30, on either side of the mounting hole 50. The struts 54 and 56 are triangular pieces that run from the back face of the body section 30, to the bottom of the clamp body 12, below the slot 24 and along the bottom surface of the body section 32.

The body section 32 provides a backing to support the force from the screws 16 and 18. Ribs 60 and 62 are on the outside surface of the body section 32. The ribs 60 and 62 are located corresponding to where the screws 16 and 18 are pointed (at locations where the axes of the threaded holes 42 and 44 intersect the body section 32). The ribs 60 and 62 provide support to body section 32 in the areas where the screws 16 and 18 press the flange in the slot 24 toward the body section 32. A back or inner face 64 of the body section 32 faces the threaded holes 42 and 44, constituting one of the surfaces that border and define the slot 24. The ribs 60 and 62 are on an outer face of the body section 32, on an opposite major surface from the inner face 64.

The clamp body 12 also has a pair of steps or stops (or tabs) 66 and 68 at the bottom of the slot 24. The steps 66 and 68 extend fully across the bottom of the slot 24, from the body portion 30 to the body portion 32. The steps 66 and 68 may be located inboard of the ribs 60 and 62, closer to plane of symmetry of the clamp body 12 located midway between the steps 66 and 68. The steps 66 and 68 provide a stop for insertion of the structure flange into the slot 24. The steps 66 and 68 also provide a pair of flat surfaces for receiving the end of the structure flange. The rest of the bottom of the slot 24 may be curved. It will be appreciated that such a curved surface may be unsuitable for receiving a flat end of the structure flange.

As noted above, the clamp body 12 may be made of a suitable material, such as cast iron. It will be appreciated that other suitable materials may be used as an alternative.

Figure 5:
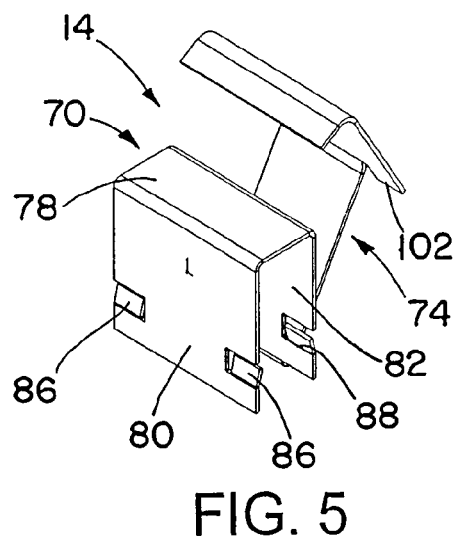
FIG. 5 is an oblique view of a spring clip of the clamp of FIG. 1.
Figure 6:
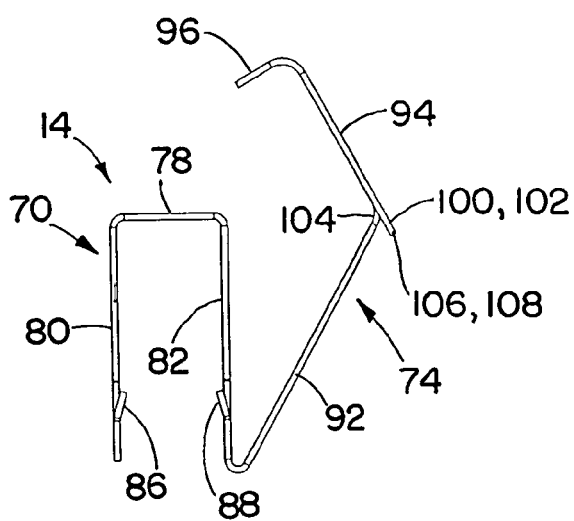
FIG. 6 is an end view of the clip of FIG. 5.

Referring now to FIGS. 5 and 6, the spring clip 14 is mounted to the clamp body 12, and is used to retain a structure flange in the slot 24 while the screws 16 and 18 are tightened. The retaining of the structure flange by the spring clip 14 provides a hands-free way to keep the clamp 10 in place during the installation process, allowing an installer to concentrate his or her attention on tightening the screws 16 and 18 to complete the installation.

The clip 14 may be a single unitary, unbroken piece of sheet metal, such as spring steel, bent and stamped to form an appropriate shape for performing its function. Broadly, the clip 14 has two parts, a U-shape grip 70 that fits over and engages the central flange portion 36 of the clamp body 12, and a folded spring 74 that is in the slot 24, and that presses the structure flange against the inner face 64 of the body section 32.

The U-shape grip 70 includes a central top portion 78, and a pair of side portions or legs 80 and 82 that are folded downward from the top portion 78 on opposite sides of the top portion 78. The side portions 80 and 82 have respective pairs of tabs 86 and 88. The pairs of tabs 86 and 88 are rectangular parts of the legs 80 and 82 that are cut and bent inward. The tabs 86 and 88 press onto the flange portion 36 when the spring clip 14 is installed on the clamp body 12, to aid in retaining the spring clip 14 coupled to the clamp body 12.

The folded spring 74 has a proximal portion 92, a distal portion 94, and a bent free end or tab 96. The proximal portion 92 is bent from the leg 82 of the grip 70. Whereas the leg 82 is directed substantially downward, the spring clip proximal portion 92 extends upward and away from the leg 82 at an angle of about 50 degrees to the horizontal. The distal portion 94 is bent back further, extending upward and back toward the leg 82 at angle of about 45 degrees to the horizontal. It will be appreciated that the angles are only example values, and that a wide variety of other angles, as well as other configurations of the folded spring, could be employed. The bent end 96 is bent downward from the distal portion 94, approximately perpendicular to the distal potion 94. The bent end or tab 96 may be pulled to disengage the spring clip 14 from a structure flange that is inserted (or is to be inserted) into the slot 24, to facilitate installing the clamp body 12 on a structure flange, or to allow for removal of the flange.

The distal portion 94 has a pair of unbent protruding tabs 100 and 102 at corners of the distal portion on opposite sides of a bend 104 between the proximal portion 92 and the distal portion 94. The distal portion tabs 100 and 102 extend into the slot 24 beyond the other parts of the spring clip 14. Edges or teeth 106 and 108 of the tabs 100 and 102 aid in engaging and holding a structure flange inserted into the slot 24 of the clamp body 12.

Figure 7:
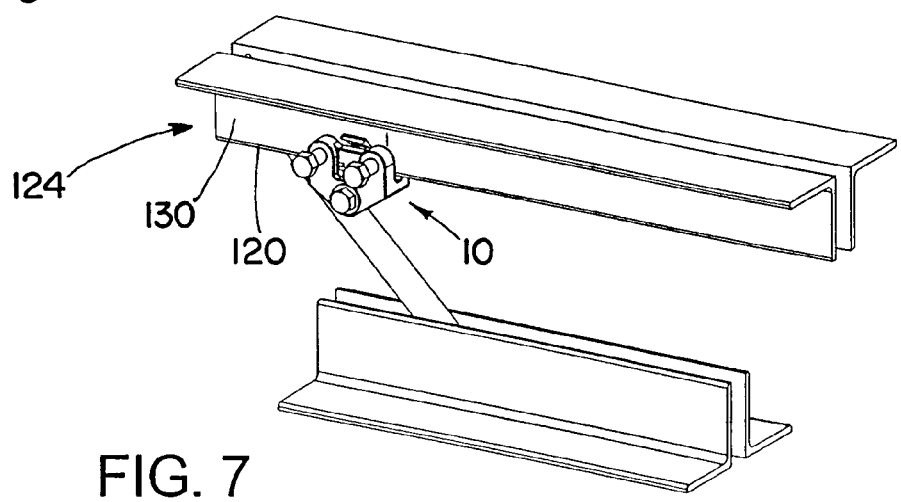
FIG. 7 is an oblique view showing installation of the clamp of FIG. 1 on a structural member, a bar joist.
Figure 8:
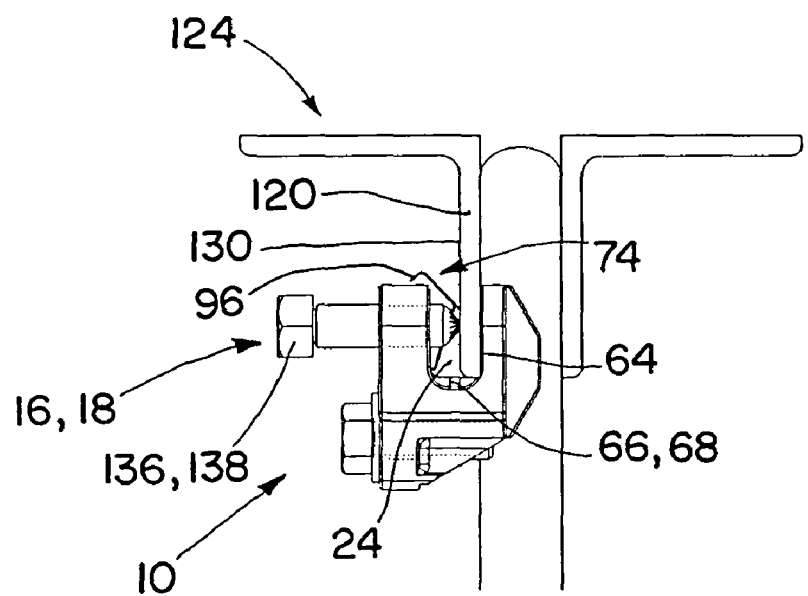
FIG. 8 is an end view of part of the installation of FIG. 7.

The configuration of the folded spring 74 described above is the unloaded configuration of the spring 74, when there are no external forces on the spring 74. When the spring clip 14 is installed on the clamp body 12 the folded spring 74 is located in the slot 24 of the clamp body, and is intended to deform when a structure flange is inserted into the slot 24, with the deformed folded spring 74 providing force against the structure flange to press the structure flange against the clamp body surface 64. This is shown in FIGS. 7 and 8, which shows the clamp 10 mounted on a flange 120 of a structural member 124. In the illustrated embodiment the structural member 124 is a bar joist, but it will be appreciated that the clamp 10 may alternatively be used to engage any of a variety of structural members having flanges.

As the flange 120 is inserted into the slot 24, the flange makes contact with the distal portion 94, pushing the distal portion 94 toward the clamp body section 30. This causes deformation of the folded spring 74, such as by resiliently bending the proximal spring portion 92 relative to the leg 82, and/or by resiliently bending the distal spring portion 94 relative to the proximal portion 92. This resilient deformation of the folded spring 74 causes a corresponding reaction force to be directed against a surface 130 of the structure flange 120, pushing the structure flange 120 against the clamp body surface 64 on the opposite side of the slot 24. This helps maintain the structure flange 120 in the slot 24. The flange 120 may be inserted until it reaches the steps 66 and 68.

The free end or tab 96 may be used to pull the spring 74 out of the way of the structure flange 120 in whole or in part as the flange 120 is inserted into the slot 24. Releasing the free end 96 causes the spring 74 to come into engagement with the flange 120 as described above, to press the flange 120 against the surface 64.

When the flange 120 is fully inserted in the slot 24, the spring distal portion tabs 100 and 102 (FIG. 6) press against the structural flange surface 130. More specifically the edges or teeth 106 and 108 (FIG. 6) of the tabs 100 and 102 press against and may bite into the surface 130. The grabs the structural flange 120 and provides a force on the surface 130 tending to retain the structural flange 120 in the slot 24. The bent end or tab 96 may be pulled to disengage the spring clip 14 from the structure flange 120 that is inserted into the slot 24, to allow for removal of the flange 120 from the slot 24, for example for repositioning of the clamp 10 on the flange 120.

The retaining of the flange 120 in the slot 24 may be sufficient to hold the clamp 10 coupled to the flange 120 as long as no significant load is placed on the clamp 10. However it may be necessary to have a stronger coupling between the clamp 10 and the flange 120 in order to maintain the coupling when a load is placed on the mounting bolt 20 of the clamp 10. Therefore after the coupling with the spring clip 14 the clamp 10 may be more securely coupled to the flange 120 by tightening the screws 16 and 18. It will be appreciated that the coupling using the spring clip 14 may hold the clamp 10 in place while the screws 16 and 18 are being tightened. The screws 16 and 18 may be engineered hardened cone tip screws. Tips 132 and 134 (FIG. 2) of the screws 16 and 18 may be tightened to bite into the face 130 of the flange 120 during installation. To insure proper biting force, the screws 16 and 18 may be shear-head or snap-off-head screws, with heads 136 and 138 of the screws 16 and 18 configured to snap off at a predetermined torque.

Once the screws 16 and 18 are tightened to secure the clamp 10 to the flange 120, load can be placed on the mounting bolt 20. The mounting bolt 20 may be used to mount a sway brace or other object to the clamp 10. The sway brace may be used to brace a pipe or other object to be braced, with another clamp used to couple together the sway brace and the pipe or other object to be braced. The clamp 10 may be part of a sway bracing system, for example to anchor sway braces for seismic bracing. The clamp 10 may be used to mount various sway bracing members in addition to non-seismic bracing or non-seismic hanging. The clamp 10 may be used to engage a variety of types and orientations of structural flanges, for instance flanges of bar joists and I-beams. Example flange thicknesses may be from 0.25 inches (6.4 mm) to 0.625 inches (15.9 mm), although it will be appreciated that a wide variety of other flange thicknesses may be engaged.

The clamp 10 makes seismic sway bracing installation easier because, among other reasons, it frees the installer's hands during the screw tightening process during installation. The holding of the flange 120 by the spring clip 14 allows the installer to reach for tools, or check the installation location, without having to hold the clamp 10 in place.

Figure 9:
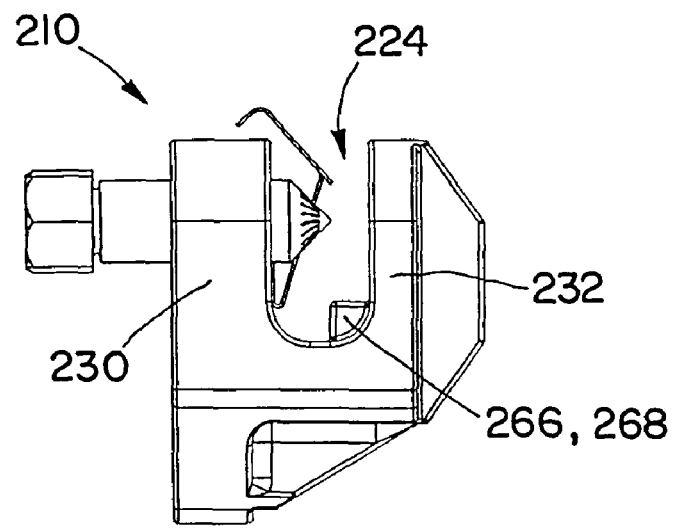
FIG. 9 is an end view of an alternate embodiment clamp according to the present invention.

FIG. 9 shows an alternate embodiment clamp 210 that is similar to the clamp 10 (FIG. 1) in most respects. The clamp 210 differs from the clamp 10 in that steps 266 and 268 of the clamp 210 do not extend all of the way across the bottom of a slot 224 between clamp body sections 230 and 232. The steps 266 and 268 extend between one third and one half of the way from the body section 232 toward the body section 230.

Although the invention(s) has (have) been shown and described with respect to a certain preferred embodiment or embodiments, it is obvious that equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the invention. In addition, while a particular feature of the invention may have been described above with respect to only one or more of several illustrated embodiments, such feature may be combined with one or more other features of the other embodiments, as may be desired and advantageous for any given or particular application.

What is claimed is:

1. A clamp comprising:
   a clamp body having a slot between two body sections of the clamp body;
   a spring clip coupled to the clamp, wherein part of the spring clip is in the slot; and
   a pair of screws engaged with threaded holes in the clamp body, wherein the screws can be tightened such that tips of the screws enter the slot;
   wherein the screws enter the slot by passing on opposite sides of where the part of the spring clip is in the slot, without contacting the spring clip.

2. A clamp comprising:
   a clamp body having a slot between two body sections of the clamp body;
   a spring clip coupled to the clamp, wherein part of the spring clip is in the slot; and
   a pair of screws engaged with threaded holes in the clamp body, wherein the screws can be tightened such that tips of the screws enter the slot;
   wherein the spring clip includes a grip engaging one of the body sections;
   wherein the spring clip does not contact the other of the body sections; and
   wherein the grip includes a tab that presses onto and grips a surface of the one of the body sections.

3. The clamp of claim 2, wherein the grip is a U-shape grip that fits over part of the one of the body sections.

4. A clamp comprising:
   a clamp body having a slot between two body sections of the clamp body;
   a spring clip coupled to the clamp, wherein part of the spring clip is in the slot; and
   a pair of screws engaged with threaded holes in the clamp body, wherein the screws can be tightened such that tips of the screws enter the slot;
   wherein the spring clip includes a grip engaging one of the body sections;
   wherein the spring clip does not contact the other of the body sections;
   wherein the grip is a U-shape grip that fits over part of the one of the body sections; and
   wherein the part of the one of the body sections is a relative thin part surrounded on three sides by a C-shape relatively thick part of the one of the body sections.

5. The clamp of claim 3, wherein the U-shape grip has a central top portion, and a pair of legs extending downward from the top portion.

6. A clamp comprising:
   a clamp body having a slot between two body sections of the clamp body;
   a spring clip coupled to the clamp, wherein part of the spring clip is in the slot; and
   a pair of screws engaged with threaded holes in the clamp body, wherein the screws can be tightened such that tips of the screws enter the slot;
   wherein the spring clip includes a grip engaging one of the body sections;
   wherein the spring clip does not contact the other of the body sections;
   wherein the grip is a U-shape grip that fits over part of the one of the body sections;
   wherein the U-shape grip has a central top portion, and a pair of legs extending downward from the top portion;
   wherein each of the legs includes one or more tabs; and
   wherein the one or more tabs of the legs engage surfaces of the one of the body portions, to couple the spring clip to the one of the body sections.

7. The clamp of claim 5, wherein the spring clip includes a folded spring that emanates from one of the legs.

8. The clamp of claim 7, wherein the folded spring includes:
   a proximal portion emanating from the one of the legs at a nonzero angle relative to the one of the legs; and
   a distal portion emanating from the proximal portion at a nonzero angle relative to the proximal portion.

9. The clamp of claim 8,
   wherein the folded spring further includes a tab emanating from the proximal portion at a nonzero angle relative to the proximal portion; and
   wherein the tab is a grip that allows a user to move the folded spring toward the one of the body portions.

10. The clamp of claim 8, wherein the distal portion has one or more tabs that protrude into the slot further than any other parts of the spring clip.

11. A clamp comprising:
    a clamp body having a slot between two body sections of the clamp body;
    a spring clip coupled to the clamp, wherein part of the spring clip is in the slot; and
    a pair of screws engaged with threaded holes in the clamp body, wherein the screws can be tightened such that tips of the screws enter the slot;
    wherein the clamp body has a pair of steps at a bottom of the slot.

12. The clamp of claim 1, wherein the clamp body is a cast iron clamp body.

13. The clamp of claim 1, wherein the spring clip is a stamped sheet metal clip.

14. The clamp of claim 1,
    wherein the clamp body includes a mounting hole; and
    further comprising a mounting bolt engaged in the mounting hole.

15. The clamp of claim 1, wherein the clamp is a seismic fitting clamp.

16. A clamp comprising:
    a clamp body having a slot therein between two body sections of the clamp body;
    a spring mechanism coupled to the clamp body, for holding a structural flange in the slot, pressing the structural flange against one of the body sections; and
    a threaded mechanism threaded into the clamp body, for biting into the structural flange in the slot while the flange is pressed against the one of the body sections by the spring mechanism.

17. A method of engaging a clamp to a structure flange, the method comprising:
    placing a clamp body of the clamp on the structure flange such that the structure flange is in a slot in the clamp body;
    coupling the clamp body to the structure flange using a spring clip of the clamp, wherein the spring clip is coupled to a first section of the clamp body, on one side of the slot, and presses the structure flange against a second section of the clamp body, on an opposite side of the slot; and
    while the clamp body is coupled to the structure flange using the spring clip, securing the clamp body to the structure flange using screws of the clamp that are threaded into threaded holes in the clamp body, and that have tips that bite into the structural flange.

18. The method of claim 17,
wherein the spring clip has tabs; and
wherein coupling includes having tabs bite into the structural flange.

19. The method of claim 17, wherein the spring clip is a sheet metal clip having parts angled with regard to each other.

20. A seismic clamp comprising:
a clamp body having a slot between two body sections of the clamp body;
a spring clip coupled to the clamp, wherein part of the spring clip is in the slot; and
a pair of screws engaged with threaded holes in the clamp body, wherein the screws can be tightened such that tips of the screws enter the slot;
wherein the spring clip includes a U-shape grip that fits over part of one of the body sections; and
wherein the grip includes at least one tab that presses onto and grips a surface of the one of the body sections.

21. The seismic clamp of claim 20, further comprising a mounting bolt threadedly coupled to a mounting hole in the clamp body, for coupling a sway brace to the clamp body.

22. A seismic clamp comprising:
a clamp body having a slot between two body sections of the clamp body;
a spring clip coupled to the clamp, wherein part of the spring clip is in the slot; and
one or more screws engaged with one or more threaded holes in the clamp body, wherein the one or more screws can be tightened such that one or more tips of the one or more screws enter the slot;
wherein the part of the spring clip that is in the slot includes one or more edges or teeth for biting into a structure flange inserted into the slot.

23. The seismic clamp of claim 22, wherein the one or more edges or teeth are edges on one or more tabs of the part of the spring clip that is in the slot.

24. The seismic clamp of claim 23, wherein the spring clip includes a folded spring that resiliently provide force for the biting.

25. The seismic clamp of claim 24, wherein the spring clip includes a free end that may be pulled to pull the one or more tabs away from one of the body sections.

* * * * *